UNITED STATES PATENT OFFICE.

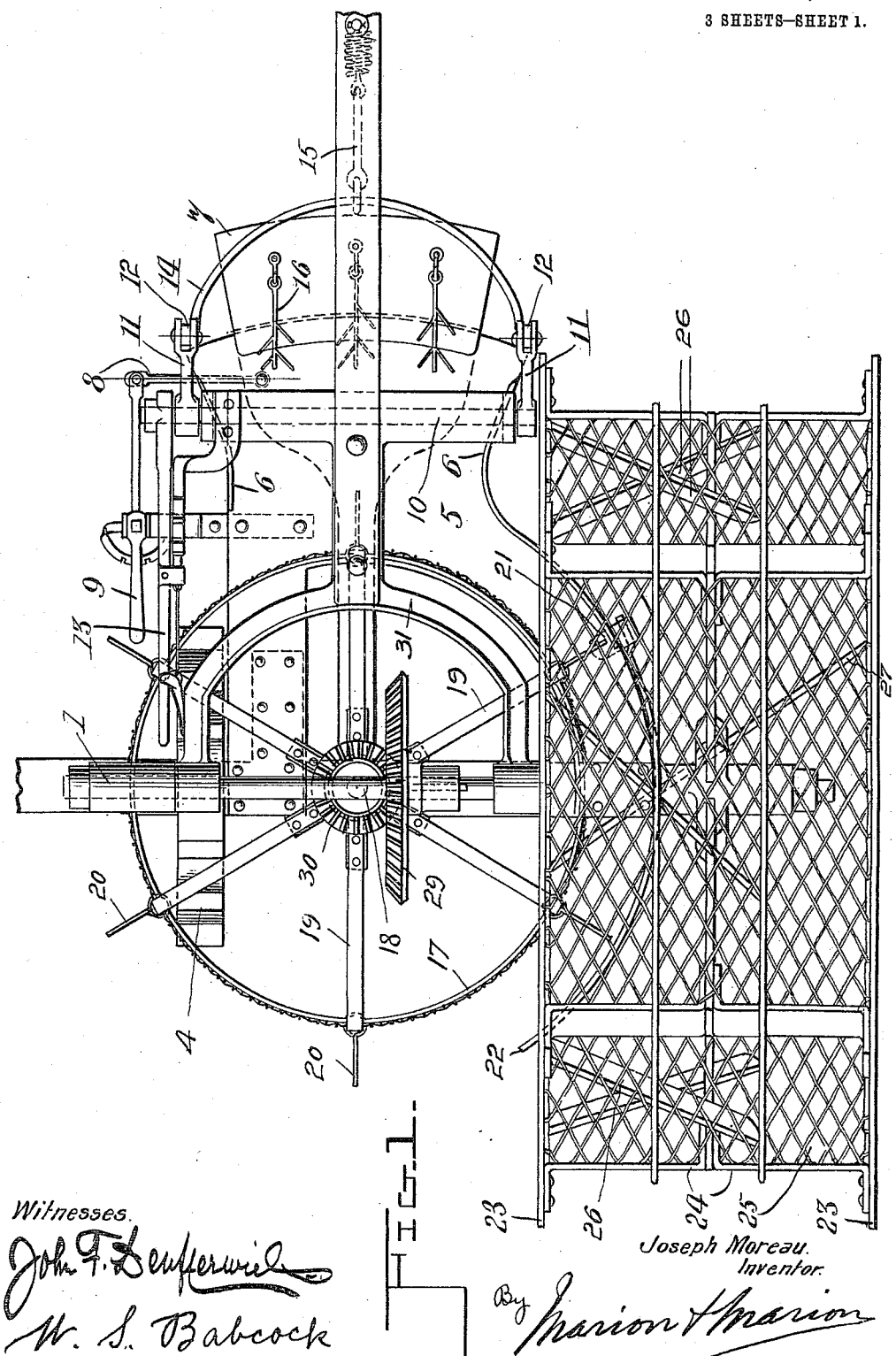

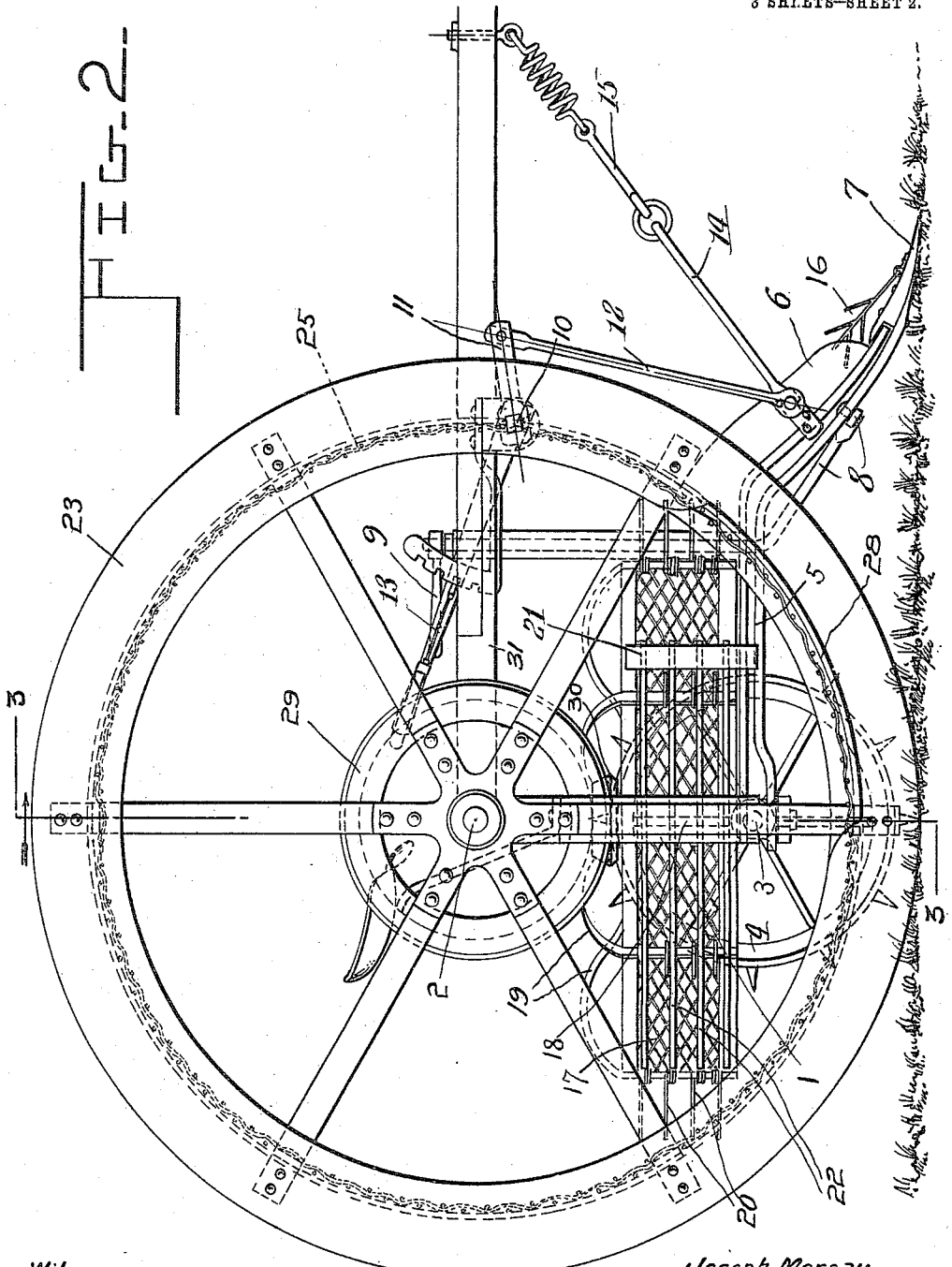

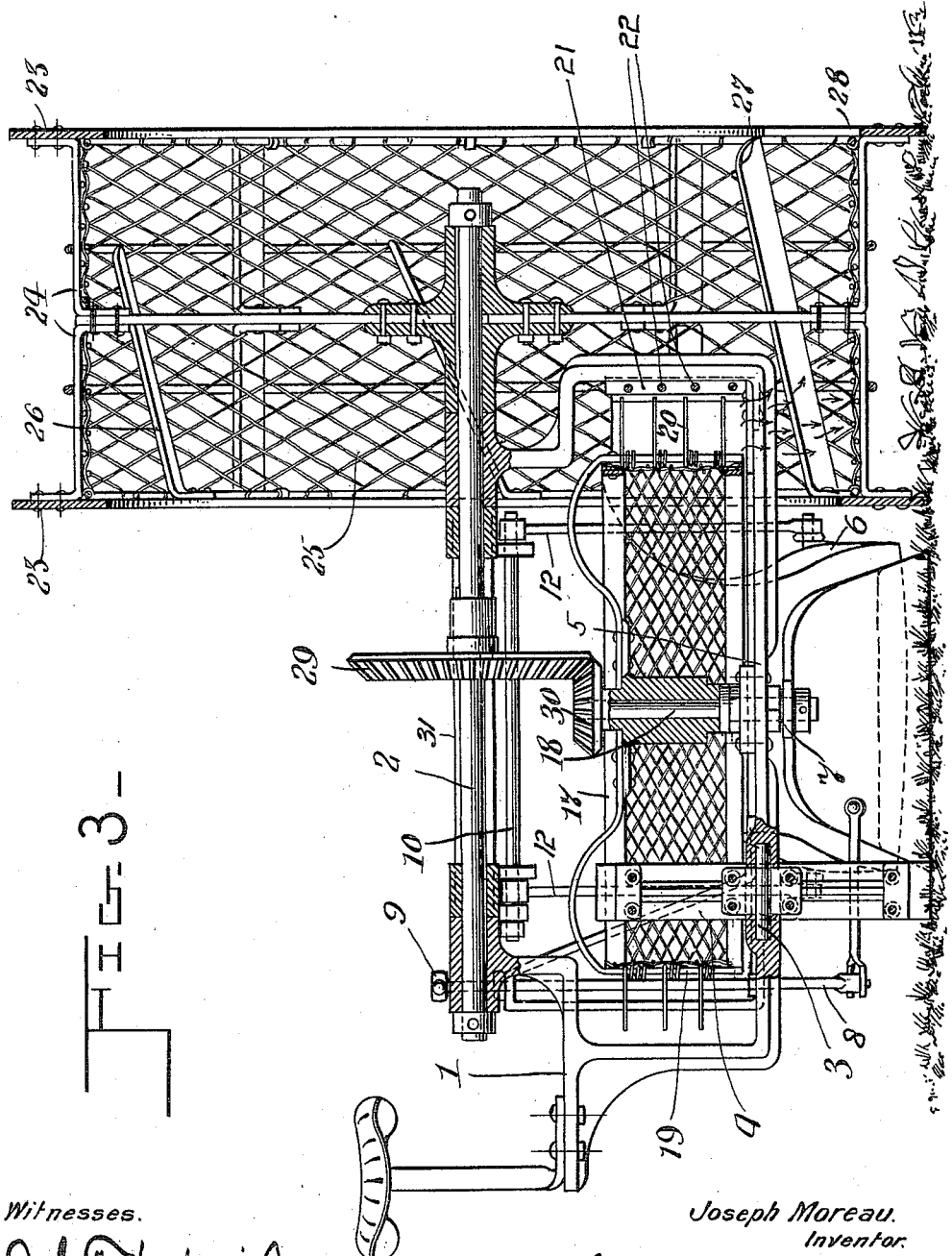

JOSEPH MOREAU, OF ST. GERMAIN DE GRANTHAM, QUEBEC, CANADA.

POTATO-DIGGER.

986,077. Specification of Letters Patent. Patented Mar. 7, 1911.

Application filed October 17, 1907, Serial No. 397,893. Renewed July 28, 1910. Serial No. 574,353.

*To all whom it may concern:*

Be it known that I, JOSEPH MOREAU, a subject of the King of Great Britain, residing at St. Germain de Grantham, county of Drummond, in the Province of Quebec, Canada, have invented certain new and useful Improvements in Potato-Diggers; and I do hereby declare that the following is a full, clear, and exact description of the invention, such as will enable others skilled in the art to which it appertains to make and use the same.

The present invention relates to machines for gathering or harvesting various vegetable root crops, such as potatoes, turnips, beets and the like.

Broadly speaking, it comprises a suitable framework, carrying an adjustable plow, and conveying apparatus adapted to receive the roots as they are dug and convey them to a screen drum, in which they are separated from the earth accompanying them, and from which they are delivered at regular intervals.

In order to more thoroughly disclose the construction, operation and use of the machine, reference should be had to the accompanying drawings forming part of the present application, and in which like reference characters designate similar parts in the several views.

In the drawings: Figure 1 is a plan view of the machine; Fig. 2 is a side elevation; and, Fig. 3 is a central cross sectional view, taken on line 3—3 of Fig. 2.

A two-part framework 1 is suspended from the shaft 2 and adapted to oscillate about said shaft. The two parts of this framework are joined by a short rod 3, constituting an axle for the two-part supporting spurred wheel 4. Thus the rod 3 is both an axle, for the wheel 4, and a connecting means for the two parts of the frame 1. The wheel 4 is positioned after the frame parts are connected, and therefore, as will be obvious, must be made of several parts, which are securely bolted together about the axle.

The framework 1 has rigidly secured thereto the combined chute and runway 5, formed to present a downwardly inclined and forwardly projecting chute provided with guide flanges 6 adapted to guide the potatoes from the plow to the horizontal runway. One of these flanges, preferably the one on the right of the machine, is extended rearwardly, and coöperates with the runway to retain the potatoes as they are conveyed to the screen drum, as will later appear.

In order to facilitate plowing or digging the potatoes from irregular or crooked rows, it is essential to move the plow to follow the lines of the rows, and to that end, the scoop or blade 7 is connected by links or rods 8 to a hand lock-lever 9 placed within easy reach of the driver. This blade 7 is extended rearwardly and mounted to swing about a shaft 18, passing through the framework 1. Thus by movement of the hand lever in one or the other direction, the blade 7 may be directed as desired to accurately follow the rows.

Adjustment of the plow and its coöperating parts to various depths is practically essential in machines of the present type, and to this end a shaft 10 is mounted to rotate or rock in the frame 31 of the machine, and is provided with arms 11 connected by links 12 to the flanges 6 of the vegetable chute near their forward ends. The frame 31, as shown in the drawings, comprises arms sleeved upon the axle 2 and converging forward to a junction with the tongue of the machine, where it is extended laterally in both directions, forming a support for the shaft 10. A hand lock-lever 13 is made fast to the shaft and placed easily accessible to the driver. The plow blade overlies the forward edge of the chute at all times, and therefore moves with the chute as the chute is adjusted. Thus by moving the lever 13 to adjust the chute, the plow blade 7 is similarly adjusted to vary the depth to which it runs.

In order to prevent excessive depression or lowering of the blades 7, a yoke 14 attached to the flanges 6 of the chute is coupled to the tongue of the machine by a link 15.

Beaters 16 are loosely attached to the upper face of the blade 7 and adapted to move freely about over its surface among the potatoes as they are dug. The potatoes as dug are forced up over the blade 7 and between the beaters 16, which operate to break and remove the roots and to loosen and remove a large portion of the earth accompanying the potatoes.

As the potatoes pass up over the chute they are received by a rotary conveyer, comprising a cylindrical frame 17, covered with wire mesh or the like, and mounted to rotate with the shaft 18. This frame carries a plurality of rods 19, on which are mounted ties 20 adapted to engage and convey the potatoes along the runway to the drum. The tines 20 normally project radially from the outer surface of the drum, and are held in such position by springs. When excessive pressure is applied to the tines, they will yield against the normal tension of the springs and be deflected thereby, avoiding injury either to themselves or to the parts connected with them. The tines are placed sufficiently close together to convey not only the potato vines, but the loose potatoes also. A guard comprising a plate 21 and a plurality of curved spring tines 22 is attached to one flange 6 of the runway, and is adapted to coöperate with the tines of the conveyer to remove the potato vines and other debris accompanying the potatoes as they travel toward the drum.

The drum as a whole comprises two metal rims 23, spaced apart by angle irons 24, or the like, to form a skeleton cylinder, and the cylinder so formed is covered, preferably on the interior, with wire mesh or screen 25. This cylinder, or drum, is securely fixed to the shaft 2 as an axle to thus constitute it the main wheel of the machine. A plurality of oblique guides 26 and a delivery board 27 are secured to the inner face of the drum. The guides 26 serve to force the potatoes toward the outer rim 23 of the drum as the drum rotates, so that the potatoes travel in a spiral path around the drum, and the earth is completely sifted from them before they reach the delivery board 27. By the delivery board they are forced from the drum through the opening 28 in the outer rim 23 and deposited in a pile.

As the drum rotates, the shaft 2 rotates in the same direction, driving the bevel gear 29 fixed thereto, and through it the bevel gear 30 fixed to the shaft 18. Thus rotation of the drum drives the conveyer which carries the potatoes from the plow through the runway to the drum, delivering them at the point indicated by the arrows in Fig. 3.

The machine shown is adapted to deposit the potatoes at intervals of about fifteen feet, and to that end the diameter of the drum is approximately five feet, and a single opening only is made for delivery. This is a mere matter of selection, of course, and may be varied to suit circumstances.

Many changes and alterations in the construction of the several parts, and in their various combinations and arrangements, may be resorted to without in any way departing from the field and scope of the present invention, and it is intended to include all such in the present application, wherein only one preferred form of the invention is illustrated.

Having thus fully described my invention, what I claim as new, and desire to secure by Letters Patent, is:—

1. A potato digger of the character described, comprising a plow, a rotary drum, means for delivering potatoes from said plow to said drum, a plurality of oblique guides extending part way across the drum and adapted to deflect the potatoes in a spiral course as the drum revolves, and a delivery board extending across the drum and adapted to guide the potatoes out through an opening in the drum at each revolution of the same.

2. A potato digger of the character described, comprising a plow, a rotary drum comprising two rims, one being provided with a delivery opening, a skeleton-work connecting the rims and wire mesh covering the skeleton work; means for delivering potatoes from the plow to the drum, a plurality of oblique guides extending part way across the drum and adapted to deflect the potatoes in a spiral course as the drum revolves, and a delivery board extending completely across the drum and adapted to guide the potatoes out through the delivery opening in the drum at each revolution of the same.

In witness whereof I have hereunto set my hand in the presence of two witnesses.

JOSEPH MOREAU.

Witnesses:
T. MYNARD,
LAURA GAUTHIER.

---

Copies of this patent may be obtained for five cents each, by addressing the "Commissioner of Patents, Washington, D. C."